US012534005B2

(12) United States Patent
Yang et al.

(10) Patent No.: US 12,534,005 B2
(45) Date of Patent: Jan. 27, 2026

(54) SEAT ASSEMBLY, TRIM COVER ASSEMBLY, AND METHOD OF ASSEMBLING

(71) Applicant: Lear Corporation, Southfield, MI (US)

(72) Inventors: Wenjuan Yang, Shanghai (CN); Chandrashekar Simha, Shanghai (CN); Deyun Kong, Shanghai (CN); Yong Yang, Shanghai (CN); Jiajun Li, Shanghai (CN)

(73) Assignee: Lear Corporation, Southfield, MI (US)

(*) Notice: Subject to any disclaimer, the term of this patent is extended or adjusted under 35 U.S.C. 154(b) by 246 days.

(21) Appl. No.: 18/314,947

(22) Filed: May 10, 2023

(65) Prior Publication Data

US 2024/0067066 A1    Feb. 29, 2024

(30) Foreign Application Priority Data

Aug. 31, 2022 (CN) .......................... 202211054149.9

(51) Int. Cl.
*B60N 2/58* (2006.01)
*B60N 2/60* (2006.01)

(52) U.S. Cl.
CPC ................................. *B60N 2/5883* (2013.01)

(58) Field of Classification Search
CPC ............................ B60N 2/5825; B60N 2/5833
USPC ..................................................... 297/452.58
See application file for complete search history.

(56) References Cited

U.S. PATENT DOCUMENTS

| | | | | |
|---|---|---|---|---|
| 4,773,703 | A * | 9/1988 | Krugener | B60N 2/0284 297/284.3 |
| 8,919,878 | B2 * | 12/2014 | Sakamoto | B60N 2/5825 297/452.59 |
| 10,144,320 | B2 | 12/2018 | Patterson et al. | |
| 10,232,749 | B2 * | 3/2019 | Fujikake | B60N 2/6018 |
| 10,328,828 | B2 * | 6/2019 | Fujikake | B60N 2/5825 |
| 10,532,675 | B2 * | 1/2020 | Booth | B60N 2/5825 |
| 10,682,935 | B2 | 6/2020 | Lewis et al. | |
| 2012/0306256 | A1 * | 12/2012 | Okuyama | A47C 31/02 297/452.6 |
| 2013/0033084 | A1 * | 2/2013 | Sei | B60N 2/5825 297/452.58 |
| 2013/0320744 | A1 * | 12/2013 | Sakamoto | B60N 2/5841 297/452.58 |
| 2021/0316644 | A1 | 10/2021 | Marquès et al. | |
| 2024/0067066 | A1 * | 2/2024 | Yang | B60N 2/5891 |

* cited by examiner

Primary Examiner — Shin H Kim
(74) Attorney, Agent, or Firm — Brooks Kushman P.C.

(57) ABSTRACT

A trim assembly is provided with a first trim member having a first finished surface and a second surface opposite thereto, a second trim member in contact with the second surface of the first trim member and attached to the first trim member via a first join, and a third trim member in contact with the second trim member and attached to the second trim member via a second join, the second join unaligned with the first join. The third trim member extends outwardly from the second trim member to a distal end having a first retainer. An assembly with a seat member and a trim assembly, and a seat are provided. In various non-limiting examples, the trim assembly may provide the desired shape of the seat, maintain durability and appearance, prevent looseness, and allow for use of a common seat member with trim assemblies of various appearances.

17 Claims, 4 Drawing Sheets

SEAT ASSEMBLY, TRIM COVER ASSEMBLY, AND METHOD OF ASSEMBLING

CROSS-REFERENCE TO RELATED APPLICATION

This application claims foreign priority benefits under 35 U.S.C. § 119(a)-(d) to CN patent application 2022 110 541 499, filed Aug. 31, 2022, the disclosure of which is hereby incorporated by reference in its entirety.

TECHNICAL FIELD

Various embodiments relate to a trim assembly for a vehicle seat assembly, and a method of forming the trim assembly.

BACKGROUND

A vehicle seat assembly may be provided with a trim assembly. Examples of a trim assembly and vehicle seat assembly may be found in U.S. Patent Publication No. 2021/0316614, U.S. Pat. Nos. 10,682,935, and 10,144,320.

SUMMARY

In an embodiment, an assembly is provided with a seat member comprising a seating surface, with the seating surface defining a groove extending thereacross. A first trim member comprises a first surface and a second surface opposite to the first surface, with the second surface in contact with the seat member. A second trim member is attached to the second surface of the first trim member via a first join, with the second trim member positioned between the first trim member and the seat member. A third trim member attached to the second trim member via a second join. The third trim member is received within the groove to connect the first trim member to the seat member.

In a further embodiment, the third trim member is not directly attached to the first trim member.

In another further embodiment, the first join is unaligned with the groove.

In a further embodiment, the second join is at least partially aligned with the groove.

In another further embodiment, the third trim member extends outwardly from the second trim member to a distal end having a first retainer to fasten the third trim member to the seat member within the groove.

In a further embodiment, the second trim member is attached to the first trim member via a third join that is spaced apart from the groove and is spaced apart from the first join.

In an even further embodiment, the second join is positioned between the first join and the third join.

In another further embodiment, another second trim member is attached to the first trim member via a third join that is spaced apart from the groove, with the another second trim member positioned between the first trim member and the seat member. The third trim member is attached to the another second trim member via a fourth join.

In an even further embodiment, the another second trim member is spaced apart from and nonoverlapping with the second trim member.

In a further embodiment, the seating surface defines a second groove extending thereacross. Another third trim member is attached to the second trim member via a third join. The another third trim member is received within the second groove to connect the first trim member to the seat member.

In another further embodiment, the first join comprises a seam between adjacent panels of the first trim member, decorative stitching through the first trim member, and/or a weld or a lamination between the first and second trim members.

In a further embodiment, the second join comprises a seam through the second and third trim members, and/or a weld or a lamination between the second and third trim members.

In another further embodiment, the second trim member and the third trim member each comprise a nonwoven fabric or an elastic fabric.

In a further embodiment, the first trim member comprises at least one of a leather, a leatherette, a vinyl, a knitted fabric, and/or a woven fabric.

In another embodiment, a trim assembly is provided with a first trim member comprising a first finished surface and a second surface opposite to the first surface, a second trim member in contact with the second surface of the first trim member and attached to the first trim member via a first join, and a third trim member in contact with the second trim member and attached to the second trim member via a second join, the second join unaligned with the first join. The third trim member extends outwardly from the second trim member to a distal end having a first retainer.

In a further embodiment, the second trim member is attached to the first trim member via a third join that is spaced apart from the first join and is unaligned with the second join.

In another further embodiment, another second trim member is in contact with the second surface of the first trim member and attached to the first trim member via a third join that is spaced apart from the first join and is unaligned with the second join. The third trim member is attached to the another second trim member via a fourth join that is unaligned with the third join.

In an embodiment, a seat is provided with a cushion comprising a seating surface forming a groove, and a trim assembly covering the seat member. The trim assembly has a first trim member comprising a surface, a second trim member attached to the surface of the first trim member via a first join unaligned with the groove, and a third trim member attached to the second trim member via a second join unaligned with the first join. The surface of the first trim member faces a seating surface of the cushion. The third trim member is received within the groove and connected to the cushion to retain the trim assembly thereto.

In a further embodiment, the second trim member is attached to the first trim member via a third join that is spaced apart from the first join and unaligned with the second join.

In another further embodiment, the trim assembly is provided with another second trim member attached to the surface of the first trim member via a third join that is spaced apart from the first join and is unaligned with the second join. The third trim member is attached to the another second trim member via a fourth join that is unaligned with the third join.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first trim member could be termed a second trim member, and, similarly, a second trim member could be termed a first trim member, without departing from the scope of the various described embodiments. The first trim member and the second trim member are both trim members, but they are not the same trim member.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
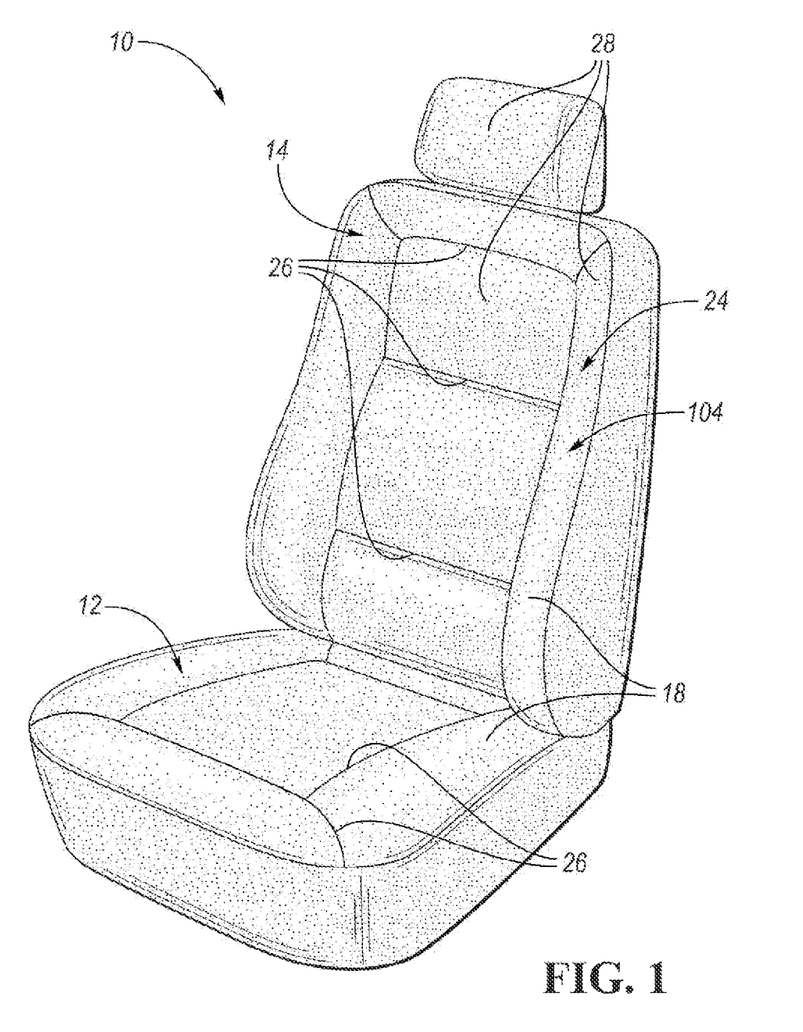
FIG. 1 illustrates a perspective view of a vehicle seat assembly.

FIG. 1 illustrates a seat assembly 10, such as a vehicle seat assembly 10. In various examples, the seat assembly 10 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 10 may be configured for use with other non-vehicle applications.

The seat assembly 10 has first and second seat members 12, 14, such as a seat base 12 and a seat back 14, respectively, that cooperate to form a seating surface 16 for a vehicle occupant. The seat members 12, 14 may each be supported via a support surface that is provided by a frame and/or a substrate, which may be formed from stamped steel alloy, a fiber reinforced polymer, or any suitable structural material. The seat base 12 may be sized to receive a seated occupant to support a pelvis and thighs of the occupant. The seat back 14 may be sized to extend upright from the seat bottom 12 to support a back of the occupant. The seat assembly may additionally have a head restraint (not shown). The seat base 12 and the seat back 14 may be moveable relative to one another to provide adjustments for the seat assembly.

The vehicle seat assembly 10 of FIG. 1 is illustrated as being covered with trim cover assembly 18. The trim assembly 18 provides the trim surface, or visible surface or A surface of the seat assembly 10.

Figures 2, 7:
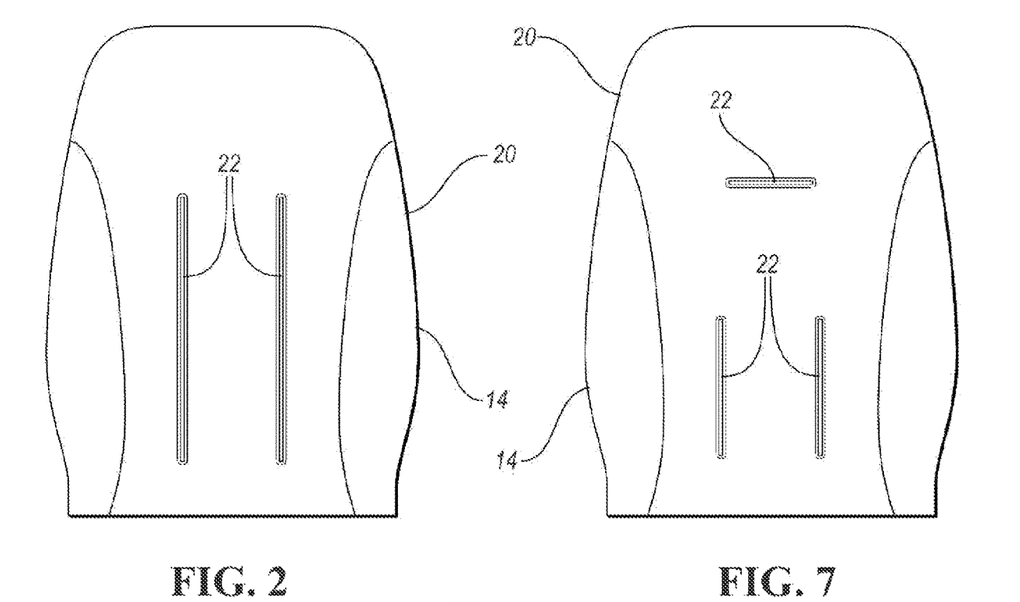
FIG. 2 illustrates a seat member for use with the vehicle seat assembly of FIG. 1 according to an embodiment.
FIG. 7 illustrates a seat member for use with the vehicle seat assembly of FIG. 1 according to another embodiment.

FIGS. 2 and 7 illustrates various embodiments of a cushion 20 for a seat member for use with the vehicle seat assembly of FIG. 1 by way of example, and in the example shown, the seat member is a seat back 14, and is illustrated as being uncovered or without the trim cover assembly 18. The disclosure may likewise be applied to a seat base 12. Each of the seat members 12, 14 include a substrate or frame structure, cushioning 20, and trim covering.

As shown in FIGS. 2 and 7, each seat member 14 includes a cushion material 20. In one example, the cushions 20 are provided by a foam material, such as a molded urethane foam, or the like. In other examples, other cushion materials are provided. The cushions 20 may be provided with one or more grooves 22 extending on the seating surface side of the cushion and seat member. The grooves 22 may each extend transversely across the seat member, longitudinally along the seat member, in another direction, or a combination thereof. Furthermore, the grooves may be linear, curved, and/or another shape. In the non-limiting example shown in FIG. 2, the grooves 22 extend longitudinally on the seat member and are spaced apart from one another. In the non-limiting example shown in FIG. 7, one groove extends transversely, and the other grooves 22 extend longitudinally, with the grooves 22 spaced apart from one another.

The trim cover assembly 18 may be provided by one or more assemblies or pieces that are attached to the underlying seat member 12, 14 using fastener(s), also referred to as retainer(s). The trim assemblies 18 may be fastened or anchored to the vehicle seat member 12, 14 into the grooves 22 using the fasteners. The fasteners may be provided by rings, hook and look fasteners, clip or push in fasteners, and the like. Trim assemblies 18 according to various examples of the present disclosure and for use with a seat assembly such as seat assembly 10 are described below in greater detail.

The disclosed trim assembly 18 and method may be used with a seat back 14, a seat base 12 or both. For simplicity, a trim assembly and a method associated with the trim assembly is described with respect to use with a seat back 14 by way of example; however, the trim assembly and method may likewise be applied to use with a seat base 12, with a seat back and base in combination, or with another vehicle component or other seating device requiring a trim cover.

In the examples described herein, the trim cover assembly 18 extends over the seating surface of the seat back member 14. As such, the trim assembly 18 may extend over one or more grooves 22 in the seat member. These grooves 22 are used to anchor the trim assembly 18 to the underlying seat member 14 and prevent sagging, bagginess, looseness, floating, tenting, or the like of the trim assembly 18, e.g. when it extends over a large surface area. The trim assembly 18 is also anchored using the grooves 22 such that the desired shape and appearance of the vehicle seat assembly 10 is met, e.g. that the trim assembly 18 provides the desired A-surfaces, contours, and other shapes. In some examples, and as shown herein, the seating surface of the trim assembly 30 may be provided with a pattern 24 as described below and as shown in FIG. 1 by way of example, and the pattern may be formed by join(s) 26 such as seams between the panels 28 of the trim cover assembly, decorative stitching into a panel 28 such as via quilting, or a combination thereof. As used herein, a join 26 may be formed by sewing, welding, lamination, bonding, or another technique.

In the examples shown, the pattern 24 for the trim cover assembly 18 is unaligned with the grooves 22 in the underlying seat member, or is diverse from the grooves 22. As used herein, unaligned means that at least portions of the pattern 24, e.g., the join 26, in the first trim member or outer trim cover of the trim assembly is spaced apart from, parallel to, angled relative to, or skew relative to the associated groove 22. The pattern 24 or joins 26 in the first trim member may further be overlapping or nonoverlapping with the grooves 26.

In other seat assemblies, one or more tie downs are used to connect the trim assembly 18 to the member 14, and these tie downs are connected to the trim assembly 18 via the joins that form the pattern 24, and the pattern 24 (and associated tie downs) are aligned with the grooves 22 in the underlying seat member. In the present disclosure, as the pattern 24 or joins 26 are at least partially unaligned with the underlying grooves 22, an alternative construction for the trim cover assembly 18 is provided as described below. As such, the same cushion 20 or seat member 12, 14 may be used with trim cover assemblies having different patterns 24 thereon, and allows for differently styled or patterned trim cover assemblies to be used with a common underlying cushion 20 and seat member 12, 14.

Figure 3:
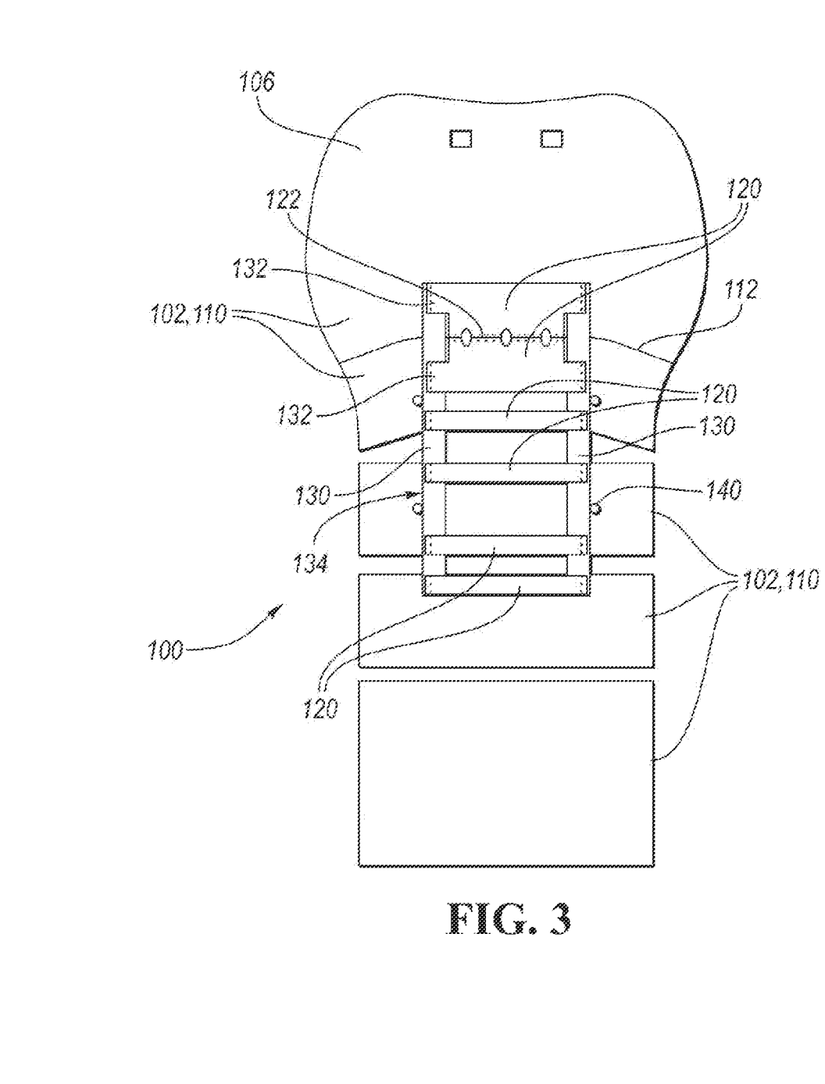
FIG. 3 illustrates a schematic view of a trim cover assembly for use with the vehicle seat assembly of FIG. 1 and the seat member of FIG. 2 according to an embodiment.
Figure 4:
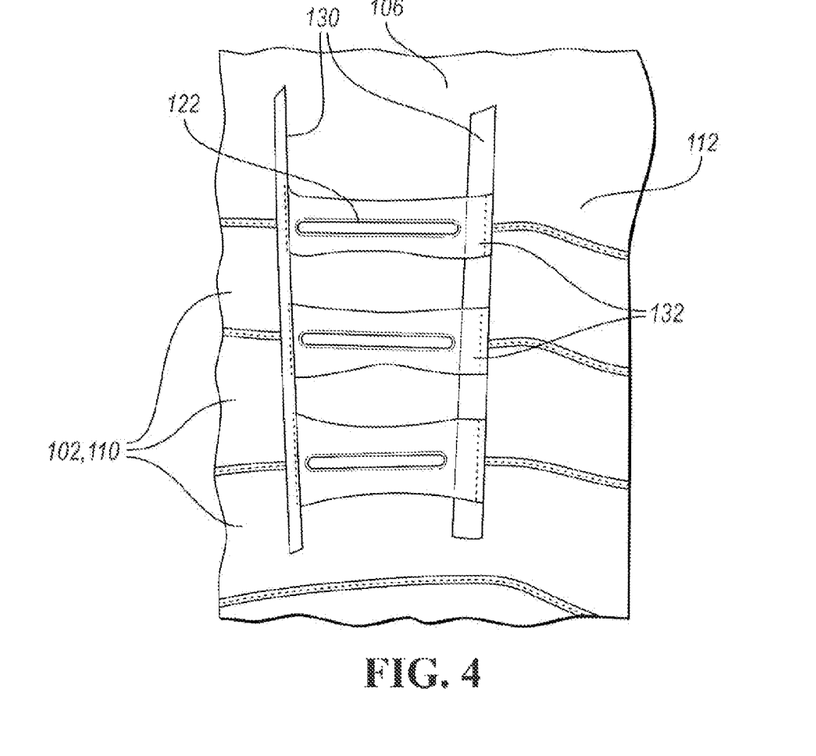
FIG. 4 illustrates a partial perspective view of the trim cover assembly of FIG. 3.

Referring to FIGS. 3-4, a trim cover assembly 100 is shown and described for use with the seat member 14 of FIG. 2 and the vehicle seat assembly of FIG. 1. The trim cover assembly 100 may be provided as trim cover assembly 18.

The trim cover assembly 100 is formed from multiple trim members. The trim assembly has a first trim member 102, or outer trim cover layer, with a first surface 104 (with reference to FIG. 1) and a second surface 106. The first surface 104 forms the finished surface, or A-surface for the trim assembly 100 and is an outer face for the trim assembly when installed on the seat member. The second surface 106 is the inner surface and faces or is in contact with the cushion 20 of the seat member when installed on the seat member.

The first trim member 102 may be formed from one or more panels 110 that are joined together, with each panel 110 joined to an adjacent panel 110 via an associated join 112 as described above. In the example shown, adjacent panels 110 are joined to one another via a seam that is sewn to connect the panels, although other joins are also contemplated. Alternatively, the first trim member 102 may be provided by or include one or more panels 110 that has a slit extending partially across the panel, which may further be surrounded by the panel.

The first trim member 102 may be formed from one or more panels 110 of fabric, such as fabrics used in vehicle interiors, and includes leather, leatherette or faux leather, vinyl, woven cloth, non-woven cloth, knitted fabric, and the like.

The trim assembly 100 has one or more second trim members 120, also referred to as trim retainers. The second trim member may be a butterfly connector or extension, or may be a diverse trim member. The second trim member 120 is attached to the second surface 106 of the first trim member 102 via a join. In one example, the second trim member 120 is sewn to first trim member at the join 112 between adjacent panels 110. The second trim member 120 may be connected to the first trim member via the same join 112 that is used to connect adjacent panels to one another, or via another join 122 that is adjacent to the selvedge or join 112 between the panels 110 of the first trim member 102. In one non-limiting example, the panels 110 of the first trim member 102 and the second trim member 120 are connected to one another via seams, or alternatively, via a weld or a lamination. The second trim member 120 is positioned between the first trim member 102 and the cushion 20 when the trim cover assembly 100 is installed on the seat member.

The join 112 between panels of the first trim member, as well as the join 112, 122 between the first trim member 102 and the second trim member 120 are unaligned with the groove(s) 22 in the associated seat member.

The trim assembly 100 also has a third trim member 130. The third trim member 130 may alternatively be referred to as a tie down. The third trim member 130 is connected to one or more of the second trim members 120 via another join 132, which may be at least partially aligned with an associated groove 22 in the underlying seat member, and may be formed from a seam through the second and third trim members 120, 130, a weld or a lamination therebetween, or a combination thereof. In various examples, the join 132 is not visible or apparent from the A-surface or first surface 104 of the first trim member 102.

The third trim member 130 extends outwardly from the second trim member 120 to a distal end 134. The distal end 134 may extend lengthwise for at least a portion of the length of an associated groove 22, and follow the shape of the groove 22. The third trim member 130 is received within an associated groove 22 in the seat member to connect the trim assembly 100 to the seat member 14, and such that the first trim member 102 overlays the seat member. One or more fasteners 140 or retainers may be provided to fasten the third trim member 130 to the seat member within the groove 22, and the fasteners 140 or retainers may be connected adjacent to the distal end 134 of the third trim member.

In various non-limiting examples, the third trim member 130 is not directly attached to the first trim member 102, and furthermore, may be connected to the first trim member 102 only via the connection to the second trim member(s) 120.

The second trim member 120 and third trim member 130 may each be formed from a piece of fabric, and in one example, and as shown, are formed from non-woven fabric or fleece. Alternatively, the second and/or third trim members 120, 130 may be formed from an elastic material.

In the example shown in FIGS. 3-4, the first trim member 102 has a pattern 24 with generally horizontal, lateral, or transverse lines, which may be formed by the seams between panels 110, while the underlying seat member 14 has vertical or longitudinal grooves 22. Multiple second trim members 120 are provided and are connected to different joins 112 between panels 110 of the first trim member 102 such that they are spaced apart from one another. In the example shown, the second trim members 120 are non-overlapping with one another, and are each connected to the first trim member 102 via an associated join 112, 122 or seam between or at adjacent panels 110 of the first trim member. Each of the joins 112, 122 for the second trim members 120 are spaced apart from the grooves 22 and/or are unaligned with the grooves 22.

A pair of third trim members 130 are connected to the second trim members 120, with each third trim member 130 connected to a respective end region of the second trim members 120 via an associated join 132. A pair of grooves 22 is provided in the underlying seat member as shown in FIG. 2, with each of the third trim members 130 received in an associated groove 22. In other examples, only one third trim member 130 may be provided, or more than two third trim members 130 may be provided, and the third trim members 130 may extend in other directions based on the positioning of the grooves 22. As shown in FIGS. 2-4, the third trim members 130 are positioned to be aligned with and received within the grooves 22, while the pattern 24, the joins 112 between panels 110 of the first trim member 102, and joins 112, 122 between the first trim member 102 and second trim members 120 are unaligned with the groove(s) 22.

Figure 5:
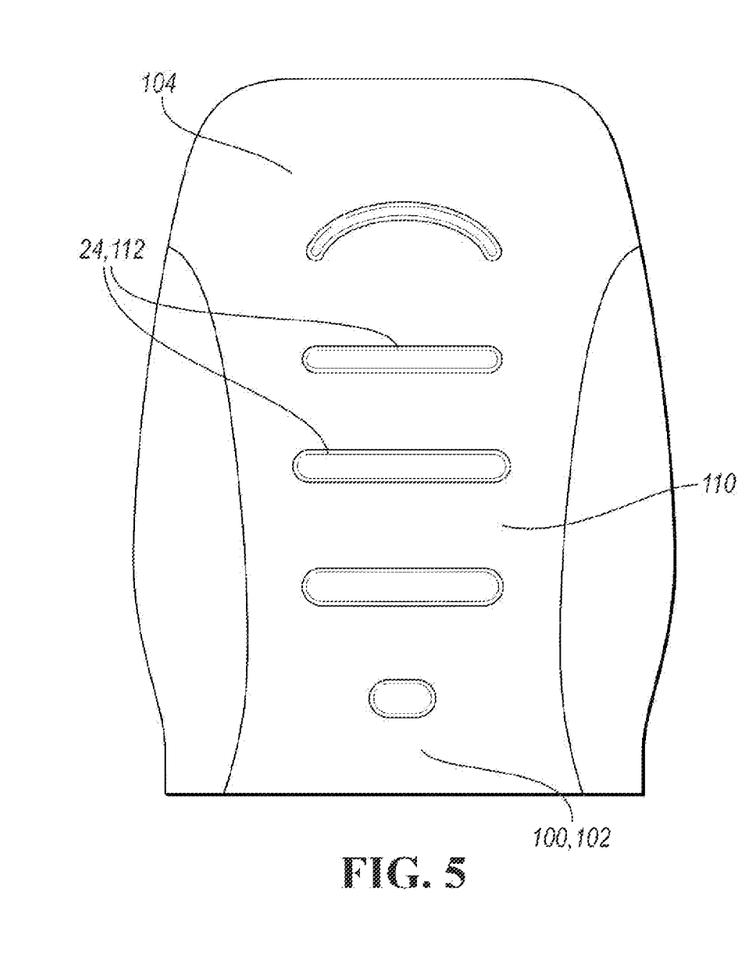
FIG. 5 illustrates a schematic view of a trim cover assembly for use with the vehicle seat assembly of FIG. 1 and the seat member of FIG. 2 according to another embodiment.
Figure 6:
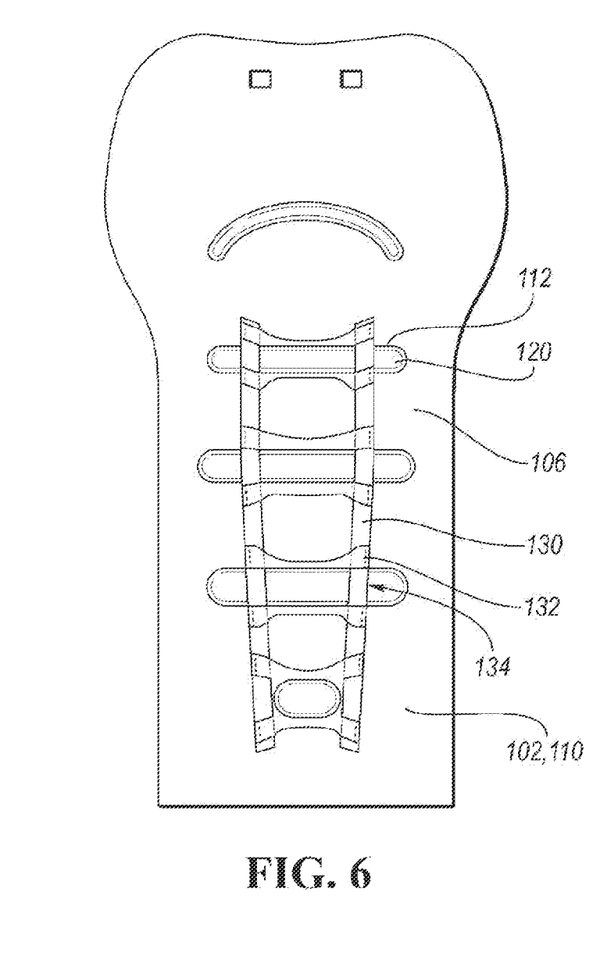
FIG. 6 illustrates a partial perspective view of the trim cover assembly of FIG. 5.

Referring to FIGS. 5-6, a trim cover assembly 150 is shown and described for use with the seat member 14 of FIG. 2 and the vehicle seat assembly of FIG. 1. Elements that are the same as or similar to those described above with respect to FIGS. 1-4 are given the same reference number. Furthermore, the description of the trim assembly 18, 100 as provided with respect to FIGS. 1-4 may be applied to the trim assembly 150 as shown in FIGS. 5-6 as appropriate.

The first trim member 102 may include one or more panels 110. A pattern 24 may be formed on the first trim member 102 via decorative stitching, such as quilting, or the like into one or more of the panels 110 of the first trim member. In the non-limiting example shown, the decorative pattern 24 and the one or more of the second trim member(s) 120 are connected to a single panel 110 of the first trim member 102.

The second trim members 120 of the trim assembly 150 are connected to the first trim member 102 via the join 112 as described above, e.g. via the decorative stitching, which is unaligned with the groove(s) 22 in the associated cushion 20. The second trim member 120 may be positioned on the second surface 106 of the first trim member 102 to be spaced apart and non-overlapping with one another. In the example shown, there are multiple second trim members 120 provided, with each second trim member 120 associated with a different region of the decorative stitching pattern 24.

A pair of third trim members 130 are provided, with each third trim member 130 connected to respective end regions of the second trim members 120 via associated joins 132 that may be formed from a seam through the second and third trim members 120, 130, a weld, a lamination, or a combination thereof. Each third trim member 130 extends outwardly from the second trim members 120 to a distal end 134, and each third trim member 130 is aligned with an associated groove 22 for use in connecting the trim assembly 150 to the seat member. In various non-limiting examples, the third trim members 130 are not directly attached to the first trim member.

FIG. 7 illustrates another non-limiting example of a seat member 14 with multiple grooves 22 extending in different directions, e.g. both transversely and longitudinally.

Figure 8:
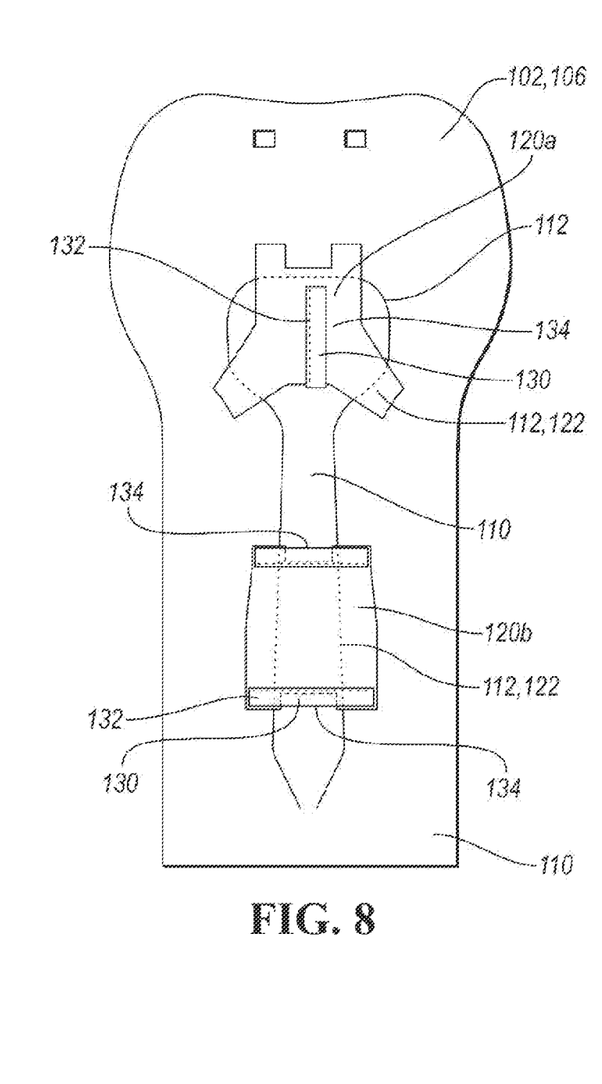
FIG. 8 illustrates a schematic view of a trim cover assembly for use with the vehicle seat assembly of FIG. 1 and the seat member of FIG. 7 according to yet another embodiment.

FIG. 8 illustrates a trim cover assembly 200 for use with the seat member 14 of FIG. 7 and the vehicle seat assembly 10 of FIG. 1. Elements that are the same as or similar to those described above with respect to FIGS. 1-7 are given the same reference number. Furthermore, the description of the trim assembly 18, 100, 150 as provided with respect to FIGS. 1-6 may be applied to the trim assembly 200 as shown in FIG. 8 as appropriate.

The first trim member 102 may include one or more panels 110. A pattern 24 may be formed on the first trim member 102 via a seam, weld, or lamination between adjacent panels 110, decorative stitching or another decorative technique into a panel 110, a combination thereof, or the like.

In the non-limiting example shown, one or more second trim members 120 are connected to the second surface 106 of the first trim member 102 via multiple joins 112, 122. Two different second trim members 120a, 120b are illustrated in FIG. 8, although any number of second trim members 120 are contemplated including one second trim member or three or more second trim members. Each second trim member 120 may be connected to one panel 110 of the first trim member 102, or to multiple panels 110 of the first trim member 102 as described above.

Each second trim member 120 is therefore attached to the second surface 106 of the first trim member 102 via at least two joins 112, 122 that are spaced apart from one another, and are also unaligned with the grooves 22 in the associated seat member. The joins 112, 122 for each second trim member 120 may be provided by a single continuous seam or join 112 between adjacent panels 110 of the first trim member, by different joins 112 between different panels 110 of the first trim member, by a single continuous decorative stitch in a panel 110, via another join 122 adjacent to a join 112 as described herein, or any combination of joins between panels and decorative patterns on the first trim member.

The trim assembly 200 also has one or more third trim members 130 associated with each second trim member 120. In the example shown, one third trim member 130 is connected to the upper second trim member 120a via a join 132 that is positioned between, spaced apart from, and unaligned with the joins 112, 122 for the second trim member 120 to the first trim member 102.

The lower second trim member 120b has a pair of third trim members 130 connected to it via associated joins 132 that are positioned between, spaced apart from, and unaligned with the joins 112, 122 for the second trim member 120 to the first trim member 102. Furthermore, each third trim member 130 is non-overlapping and spaced apart from the other third trim member 130 on the lower second trim member 120b.

The joins 132 for the third trim members 130 to their respective second trim members 120 may be formed by sewing, welding, laminating, bonding, or the like as described above.

Each of the third trim members 130 extends outwardly from the associated second trim member 120 to a distal end 134, and each third trim member 130 is aligned with an associated groove 22 for use in connecting the trim assembly to the seat member, such as the grooves 22 shown in FIG. 7. In various non-limiting examples, the third trim members 130 are not directly attached to the first trim member 102. Although the third trim members 130 are shown as extending transversely and longitudinally on the trim cover assembly 200, third trim members 130 may extend in any direction based on the corresponding grooves 22 in the underlying seat member.

In further embodiments, a trim cover assembly may be provided with a third trim member 130 connected as described above with respect to FIGS. 3-6, and with another third trim member 130 connected as described above with respect to FIG. 8.

A method according to the present disclosure is provided to assemble the trim assembly, and assemble the seat assembly, and may be used with the seat assembly 10 of FIG. 1, the seat members of FIGS. 2 and 7, and the trim assemblies 18, 100, 150, 200 as described herein. In various examples, various steps in the method may be omitted, added, rearranged into another order, or performed sequentially or simultaneously.

A second trim member 120 is attached to a surface 106 of a first trim member 102 via a first join 122, 122.

A third trim member 130 is attached to the second trim member 120 via a second join 122 unaligned with the first join.

In one example, the second trim member 120 is attached to the first trim member 102 via a third join 112, 122 that is spaced apart from the first join 112, 122 and unaligned with the second join 132.

In another example, another second trim member 120 is attached to the surface 106 of the first trim member 102 via a third join 112, 122 that is spaced apart from the first join 112, 122 and is unaligned with the second join 132. The third trim member 130 is attached to the another second trim member 120 via a fourth join 132 that is unaligned with the third join 112, 122.

The first trim member 102 is positioned such that the surface 106 faces a seating surface of a seating member 12, 14.

The third trim member 130 is positioned with the distal end 134 extending into a groove 22 formed in the seating surface of the seat member, e.g. into a cushion 20. The groove 22 in the seat member is unaligned with the first join 112, 122.

The third trim member 130 is connected to the seat member 12, 14 to retain the first trim member 102 thereto and cover the seat member 12, 14 with the trim assembly.

As such, various examples of the present disclosure provide for a trim cover assembly, such as the trim cover assembly 18, 100, 150, 200. The trim assembly 18 may have various patterns formed by a join, such as a seam, quilting, weld, lamination, or other technique. The tie down, or third trim member, is attached to the first trim member (e.g. the outer trim cover layer) via a tie down retainer (e.g. the second trim member(s). For example, the second trim member, or trim member retainer, may be connected to the outer trim cover layer via one or more join seams, quilting seams, horizontal quilting seams, angle join seams, angle quilting seams, curved join seams, curved quilting seams, or other seams or joins for the outer trim cover layer. The tie down is connected to the trim retainer The pattern formed in the first trim layer may be different than the grooves 22 in the underlying seat member. The join between the outer trim cover layer and the tie down retainer, and that forms at least a part of the pattern, may therefore be a different direction from the grooves or other attachment features on the cushion 20 and seat member. The tie down, or third trim member, may be connected to the trim retainer based on the associated cushion 20 and seat member, and independent of the pattern on the outer trim cover, or first trim member.

The trim assembly 18 allows for different patterns and different trim assemblies to be used with the same underlying seat member and grooves 22, or a common cushion 20, and without changing the grooves 22 to correspond with the trim assembly 18 and the pattern and joins therein.

The trim cover assembly 18 is connected to the underlying cushion of the seat member via the grooves 22 such that the desired shape and appearance of the seat member is met. The trim cover assembly 18 cooperates with the grooves 22 of the seat member to prevent or limit sagginess, bagginess, looseness, floating, and tenting on the trim cover surface, which in turn, may improve durability and appearance of the seat assembly 10.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An assembly, comprising:
   a seat member comprising a seating surface, the seating surface defining a groove extending thereacross;
   a first trim member comprising a first surface and a second surface opposite to the first surface, the second surface in contact with the seat member;
   a second trim member attached to the second surface of the first trim member via a first join such that the first join is unaligned with the groove, the second trim member positioned between the first trim member and the seat member; and
   a third trim member attached to the second trim member via a second join, wherein the third trim member is received within the groove to connect the first trim member to the seat member.

2. The assembly of claim 1 wherein the third trim member is not directly attached to the first trim member.

3. The assembly of claim 1 wherein the second join is at least partially aligned with the groove.

4. The assembly of claim 1 wherein the third trim member extends outwardly from the second trim member to a distal end having a first retainer to fasten the third trim member to the seat member within the groove.

5. The assembly of claim 1 wherein the second trim member is attached to the first trim member via a third join that is spaced apart from the groove and is spaced apart from the first join.

6. The assembly of claim 5 wherein the second join is positioned between the first join and the third join.

7. The assembly of claim 1 further comprising another second trim member attached to the first trim member via a third join that is spaced apart from the groove, the another second trim member positioned between the first trim member and the seat member; and wherein the third trim member is attached to the another second trim member via a fourth join.

8. The assembly of claim 7 wherein the another second trim member is spaced apart from and nonoverlapping with the second trim member.

9. The assembly of claim 1 wherein the seating surface defines a second groove extending thereacross; wherein the assembly further comprises another third trim member attached to the second trim member via a third join; and wherein the another third trim member is received within the second groove to connect the first trim member to the seat member.

10. The assembly of claim 1 wherein the first join comprises a seam between adjacent panels of the first trim member, decorative stitching through the first trim member, and/or a weld or a lamination between the first and second trim members.

11. The assembly of claim 1 wherein the second join comprises a seam through the second and third trim members, and/or a weld or a lamination between the second and third trim members.

12. The assembly of claim 1 wherein the second trim member and the third trim member each comprise a nonwoven fabric or an elastic fabric.

13. The assembly of claim 1 wherein the first trim member comprises at least one of a leather, a leatherette, a vinyl, a knitted fabric, and/or a woven fabric.

14. The assembly of claim 1, wherein the second join is not visible from the first surface of the first trim member.

15. A trim assembly, comprising:
a first trim member comprising a first finished surface and a second surface opposite to the first surface;
a second trim member in contact with the second surface of the first trim member and attached to the first trim member via a first join; and
a third trim member in contact with the second trim member and attached to the second trim member via a second join, the second join unaligned with the first join, wherein the third trim member extends outwardly from the second trim member to a distal end having a first retainer.

16. The trim assembly of claim 15 wherein the second trim member is attached to the first trim member via a third join that is spaced apart from the first join and is unaligned with the second join.

17. The trim assembly of claim 15 further comprising another second trim member in contact with the second surface of the first trim member and attached to the first trim member via a third join that is spaced apart from the first join and is unaligned with the second join; and wherein the third trim member is attached to the another second trim member via a fourth join that is unaligned with the third join.

* * * * *